United States Patent Office 3,125,330
Patented Mar. 17, 1964

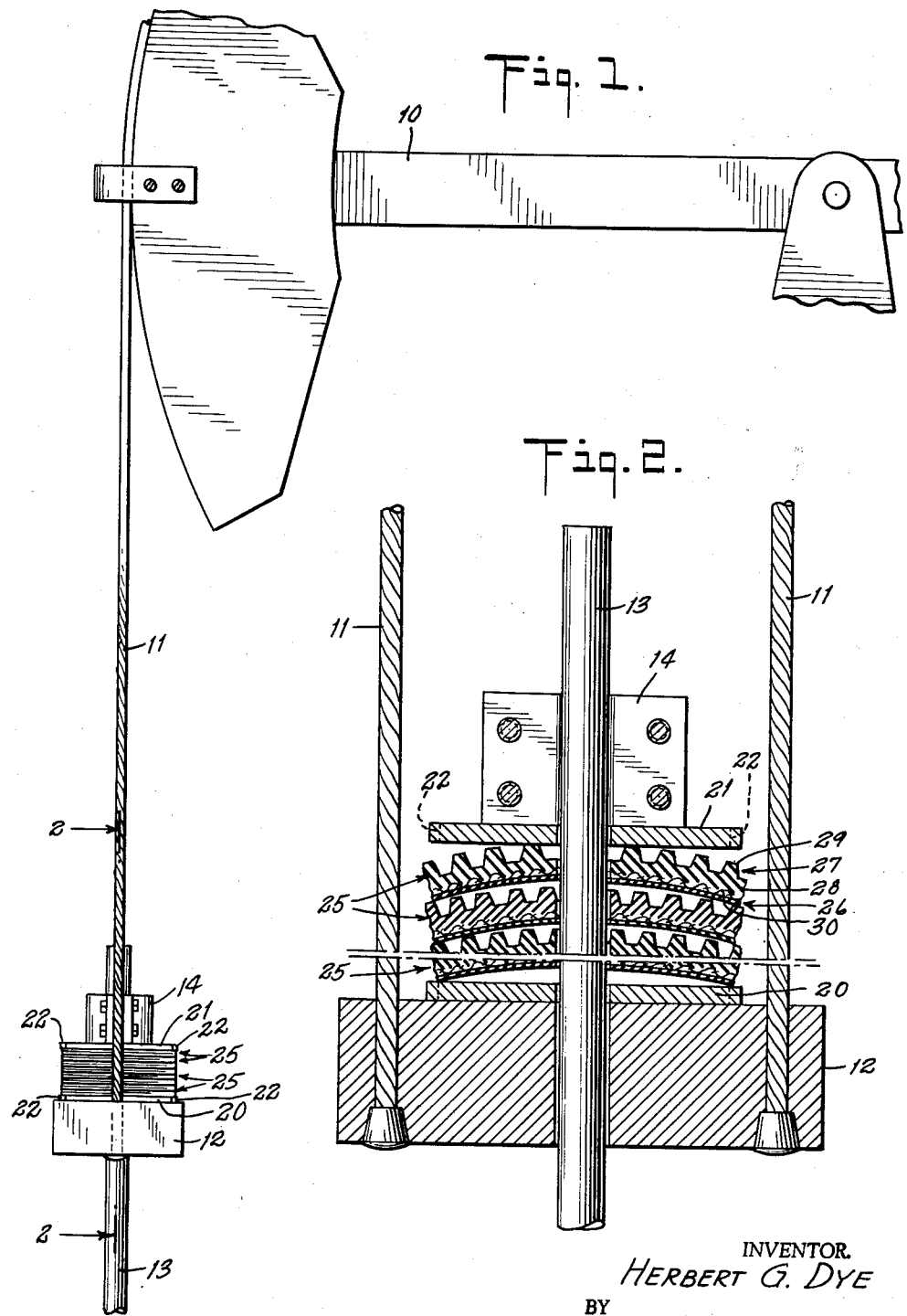

3,125,330
POLISH ROD SHOCK ABSORBER
Herbert G. Dye, Tulsa, Okla., assignor to American Metal Climax, Inc., New York, N.Y., a corporation of New York
Filed Feb. 15, 1962, Ser. No. 173,415
3 Claims. (Cl. 267—1)

This invention relates to an improved shock absorber for use as a connection between a polish rod of an oil well pumping unit and the associated walking beam thereof.

Various types of shock absorbing devices have been employed heretofore between the walking beams and polish rods of oil well pumping apparatus. Many of these prior devices are quite costly and often entail the discarding of existing equipment furnished with standard pumping apparatus. Further, the life of many of these known devices is relatively short under the substantial stresses, vibration and impact shocks they are subjected to in practice. This results in accidents, delays and heavy expense in replacement, as is quite well understood in this art.

The primary object of the present invention is to provide a simply constructed and durable cushioning unit which is capable of being easily and quickly incorporated in existing standard well pumping equipment without alteration thereof and which will operate effectively with improved results as a shock absorber at the place indicated for substantial periods without failure or breakage of associated equipment.

Another object of the invention is to provide an inexpensive, reliable cushioning unit construction which can be made from materials already available in the field and utilizing the equipment on hand.

Other objects, as well as the advantages of the invention, will appear from the following description when read in connection with the accompanying drawings, in which FIG. 1 is a side elevational view of an end of a walking beam provided with a hanger having associated therewith a shock absorber embodying the invention; and FIG. 2 is a vertical section showing in enlarged detail the construction of my improved shock absorber.

In the drawings, the reference numeral 10 designates the outer end of the walking beam of conventional form and construction and from which is suspended a hanger 11 of known construction. As is usual the shock absorber of this invention serves as a connection between the carrier bar 12 of the hanger and a polish rod 13 extending up from a well head assembly. As is also usual, adjustment of such connection is made by adjusting a polish rod clamp 14 of known construction on the top of the polish rod 13.

The shock absorber of the invention is mounted on the carrier bar 12 of the hanger and is maintained in assembled relation thereon by the polish rod 13 which extends therethrough, the clamp 14 which normally rests on the top of the shock absorber, and the supporting wires 11 of the hanger. The shock absorber is constituted of a loose assembly of only two differently constructed parts which are readily available around most well installations, or can be conveniently obtained at little expense. One of such parts comprises the top and bottom of the shock absorber and may be composed of two flat steel plates 20 and 21 approximately ⅝″ thick and 8″ square. Holes of approximately 1 5/16″ diameter are readily cut in the plates by a welding torch to provide centrally located openings through which the polish rod extends. The corners of the plates are cut away to provide chamfered edges 22 as a safety feature.

The plates 20, 21 function as a compressing or retaining means for the other of said parts, plate 20 resting directly on the carrier bar 12 and plate 21 forming the top of the shock absorber and as a rest for the clamp 14. Located in between the two plates 20, 21 are a plurality of such other parts, each of which is designated generally in the drawings by the numeral 25. The number of the parts 25 will depend on the depth of the particular well at which the apparatus is assembled, approximately eight of such parts being adequate for most well depths, but being preferably greater in number for wells of relatively great depth. It can readily be estimated by the operator of a given well how many of the parts 25 will be needed to take care of the load thereat.

Each of the parts 25 has an area comparable to the area of the plates 20, 21 so that the shock absorber unit is substantially uniform dimensionally throughout its height. It will be noted in the drawings that as the dimension of the plates 20, 21 and parts 25 in one direction, is only slightly less than the distance between the supporting wires 11 of the hanger, and as such plates and parts are rectangularly shaped, the hanger wires 11 will tend to maintain them in proper assembled relation during the stroking operations of the pumping apparatus. The parts 25 are each composed of a section of an automobile tire, preferably a 10 ply truck tire. The parts 25 are formed from such a tire by first cutting off the bead and side wall of the tire and then cutting out eight by eight inch sections from the complete tread. A hole about 1 ⅝″ diameter is then cut in the center of each of such sections with an oversized belt punch to provide openings aligned with those of the plates 20, 21 to receive the polish rod 13.

It will be noted in FIG. 2 of the drawings, that each of the parts or tire sections 25 is composed of a base layer 26 formed from the casing of the truck tire and having superposed thereon a layer 27 formed from the tread of such tire. The layer 27 is composed of a thick, hard vulcanized rubber body 28 having a suitable tread design 29 impressed therein. Embedded in the rubber body 28 is the usual nylon cord fabric layer 30 which is bonded in place therein to give added strength to the tread against rupture and puncture.

The tire sections 25 are placed in superposed relation, one on the other, with the tread design 29 preferably uppermost so that the tread design of each of such sections is associated with the plain inner surface of the casing layer 26 of an adjacent overlying section and the tread design of the top section 25 is associated with the plain undersurface of the top plate 21. The casing layer 26 of the bottom section 25 rests upon the upper plain surface of the bottom plate 20. It is within the contemplation of this invention to reverse this order so that the casing layers 26 of the sections are uppermost, and the tread layers 27 thereof lowermost, but in either case the sections 25 should be arranged in a like manner between the plates 20, 21.

It will thus be observed that when the tire sections 25 are suddenly compressed between the plates 20, 21 on the upstroke of the pumping apparatus, the shock that is absorbed by the tire sections, will be initially dissipated by completely flattening out the stiff sections against the yielding resistance of the air pocketed in the tread designs 29, and then will be further dissipated by the compression of the vulcanized rubber bodies 28 against the resistance of the nylon cords 30 in such bodies. When the pressure is released on the downstroke of the pumping apparatus, the rubber material and casing of the sections return to their original shapes due to the inherent resiliency of the rubber material and the built-in resiliency of the casing construction and the nylon cord construction.

It has been found that the construction of this invention, provides an efficient and smooth working shock absorber that is longer lasting than known devices of this type and has resulted in a substantial reduction in the replacement of broken rods with a consequent reduction of lost production. It will also be apparent from the foregoing description, that the parts which make up the shock absorber are conveniently at hand to almost all well installations and can be economically assembled on known standard types of installations.

I claim:

1. The combination with a pump polish rod, a beam hanger carrier bar, and a rod clamp, of a shock absorber unit interposed between the clamp and the bar, and composed of bottom and top plates constituted of flat metal sheets of substantial thickness, and a plurality of curled sections of the tread portion of an automobile tire arranged in like relation between said plates so that said tire sections all curl in the same direction and the inner tread surfaces of such sections are in opposed relation to the inner casing surfaces thereof, said plates and said tire sections being vertically stacked in face-to-face relation and having aligned openings through which the polish rod extends, and said plates and tire sections being loosely assembled in such stacked relation on said polish rod so that said tire sections are released in the raised position of said rod clamp.

2. The combination with a pump polish rod, a beam hanger carrier bar, and a rod clamp, of a shock absorber unit interposed between the clamp and the bar, and composed of bottom and top plates constituted of flat metal sheets of substantial thickness, and a plurality of plate-like members, each consisting of a curled section of the tread portion of an automobile tire and constituted of a casing layer and a rubber layer having a tread design impressed thereon and a fabric layer embedded therein, said plate-like members being arranged in vertically stacked face-to-face relation between said plates with the casing layer of one member in engagement with the tread of an adjacent member so that such members all curl in the same direction, said plates and said members being of rectangular form and having aligned openings through which the polish rod extends and said plates and members being loosely assembled in such stacked relation on said polish rod so that said tire sections are released in the raised position of said rod clamp.

3. The combination of claim 2, in which said beam hanger carrier bar is supported in suspended relation by a pair of spaced supporting means, and in which said rectangular plates and members have a dimension in the direction of the distance between said supporting means, such that said supporting means maintain said plates and members in proper stacked relation during the operations of the polish rod and rod clamp.

References Cited in the file of this patent

UNITED STATES PATENTS

| Re. 24,276 | Schuyler | Feb. 12, 1957 |
| 2,038,527 | Eaton | Apr. 28, 1936 |
| 2,241,409 | Mason | May 13, 1941 |
| 2,711,312 | Ratigan | June 21, 1955 |
| 2,889,056 | Blattner | June 2, 1959 |